July 1, 1969  E. LANGECKER  3,452,391
DEVICE FOR THE PRODUCTION OF HOLLOW BODIES OF THERMOPLASTIC
SYNTHETIC MATERIAL IN THE BLAST PROCESS
Filed Oct. 14, 1965  Sheet 1 of 5
Fig. 1
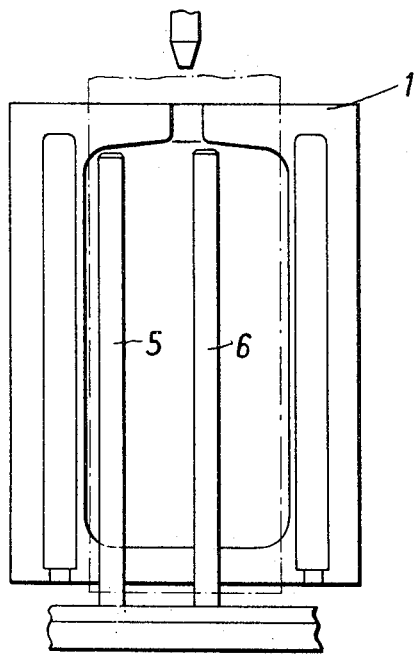
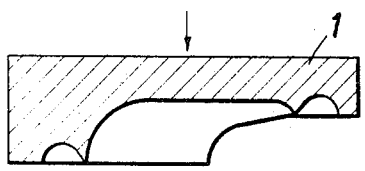
Fig. 2
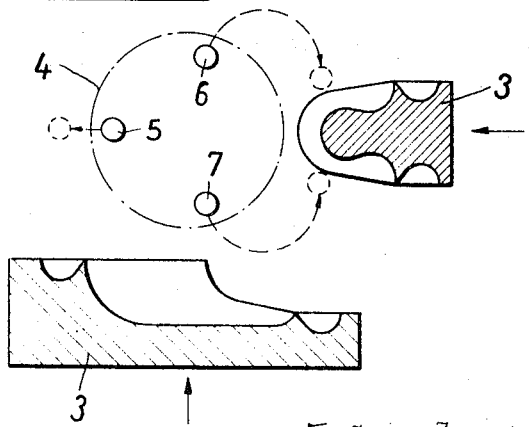
Inventor:
Erhard Langecker
By
Watson, Cole, Grindle & Watson
Attys.

Inventor:
Erhard Langecker
By
Watson, Cole, Grindle & Watson
Attys.

July 1, 1969 E. LANGECKER 3,452,391
DEVICE FOR THE PRODUCTION OF HOLLOW BODIES OF THERMOPLASTIC
SYNTHETIC MATERIAL IN THE BLAST PROCESS
Filed Oct. 14, 1965
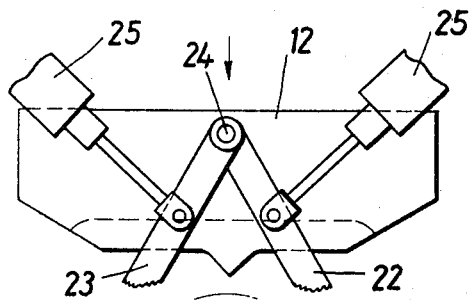
Fig. 8
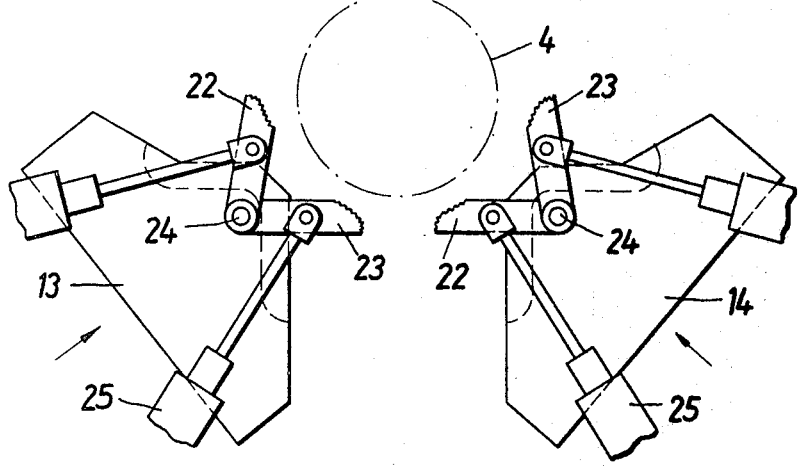
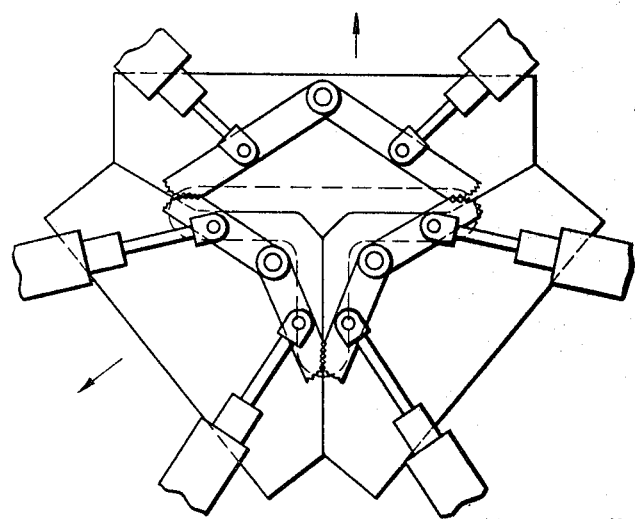
Fig. 9
Inventor:
Erhard Langecker
By
Watson, Cole, Grindle & Watson
Attys.

United States Patent Office 3,452,391
Patented July 1, 1969

3,452,391
DEVICE FOR THE PRODUCTION OF HOLLOW BODIES OF THERMOPLASTIC SYNTHETIC MATERIAL IN THE BLAST PROCESS
Erhard Langecker, Meinerzhagen, Germany, assignor to Gebr. Battenfeld, Meinerzhagen, Germany, a German company
Filed Oct. 14, 1965, Ser. No. 495,924
Claims priority, application Germany, Dec. 23, 1964, B 79,865
Int. Cl. B29d 23/03
U.S. Cl. 18—5      4 Claims

ABSTRACT OF THE DISCLOSURE

A device for moulding hollow bodies of irregular shapes by a blast process and having at least three mould parts and spreader mandrels insertable into the mould parts and engaging a round tube to form hollow bodies of thermoplastic materials.

---

The invention relates to a device for the production of hollow bodies of thermoplastic synthetic material in the blast process and to apparatus for carrying it into effect.

In the production of hollow bodies of plastic in the blast process one starts out as a rule with a tube-shaped blank which is introduced by the spray nozzle into the opened mould. When the blank has been inserted, the mould is closed and the tube is blasted to form the hollow body determined by the shape of the mould. This known blast process can be used advantageously and without difficulty where the cross-section of the hollow body to be blasted is approximately of the same shape as the circular cross-section of the tube. When hollow bodies having a cross-section differing substantially from the circular have to be blown, difficulties arise in that in the blowing the tube is extended to varying degrees, so that in blasting from a tube there occurs during the blast process an elongating of the plastic material, which frequently of necessity leads to differing wall thicknesses of the blown hollow body.

It has already been proposed, in the blowing of flat hollow bodies from a tube, to give the tube blank introduced into the open mould a pre-shaping before the closing of the mould; this being done by pre-deforming the tube blank from its round shape into an elongated, flat shape, by means of two spreading elements lying opposite each other and engaging from the outside or from the inside onto the tube, in order to give the blank the approximate shape of the body to be blasted, before the mould is finally closed. The spreading of the tube takes place here either by a spreading lever engaging on the outer surface of the tube, which grips the tube blank over and underneath the shape during the closing movement of the two-part mould and transforms it into the elongated shape; or in a variation of this proposal spreader mandrels are provided for the same purpose, which engage in the tube blank, and likewise transform the round tube into an elongated, flat tube. When the mould is completely closed, the tube, pre-shaped by the spreading elements, is blasted into the final shape determined by the mould concerned.

The applicants have set themselves the task of producing from a tube hollow bodies of any desired cross-section, in deviation from the circular cross-section, in the blast process without there being the risk of an alteration of the wall thickness of the blown bodies. The process of the invention has the feature that the tube is inserted into an open mould consisting of at least three parts, and is spread by a number of spreading elements corresponding to the number of parts composing the mould, and further that the edges of the mould parts closing the tube, on the closing of the mould are moved into the interior of the mould over the actual joining line of the engagement points of each two adjacent spreading elements.

Using the device of the invention, from a tube hollow bodies can be blown having any desired cross-section, for example hollow bodies with triangular or star-shaped cross-section or even hollow bodies of alternating cross-section, as occurs for example with toys, in particular running animals. Also, in the manufacture of equipment parts or packing parts, bodies may be required having cross-sections which necessitate a mould with more than two mould parts. The device of the invention accordingly makes possible the manufacture of hollow bodies of any desired cross-section from a tube, the pre-shaping carried out by the separate spreading elements ensuring the maintenance of an even wall thickness throughout.

In accordance with the shape of the hollow body desired in any particular instance, use is made of three-part or multi-part moulds and the preforming takes place by means of the spreading elements of the invention arranged in each mould part. In the device of the invention the fact is important that the closure edges of the separate mould parts on the closing of the mould are all moved into the interior of the mould over the actual joining line of the spreading points alloted to them, so that on the closing of the mould they form a cohesive base.

Frequently hollow bodies are required with cross-section showing inwardly directed indentations. Bodies of this type also can be manufactured without difficulty with the device of the invention, by arranging that at least one mould-part determining the indentation for at least a part of its length during the spreading is conveyed inwardly over the actual joining line of the spreading elements accorded to it; in the interests of an even distribution of the material it is important that the spreading elements accorded to the mould-part determining the indentation should be moved non-lineally during the spreading, in such a way that at their greatest distance the mould-part determining the indentation comes into engagement with the surface of the spread tube. If the spreading elements of the mould part determining the indentation were to carry out a lineal spreading movement, insufficient material would be available for the mould part entering the mould and determining the indentation with the result that during the insertion of the said mould-part into the interior of the tube, the part of the spread tube coming into engagement with it would be subjected to an undesirable stretching, which must lead to a weakening of the wall thickness. This disadvantage is overcome by arranging that the spreading elements for the mould-part determining the indentation shall have during their spreading movement a non-lineal, preferably arcuate or hook-shaped movement, so that at the moment when the two spreading elements have the greatest mutual distance, the mould-part determining the indentation comes into engagement with the surface of the spread tube. During the subsequent movement of the mould-part into the interior of the mould, the spreading elements are approached towards each other along any desired movement-path, so that during the movement of the mould-path into the mould, a stretching of the material is avoided. The movement-paths of the spreading elements can for example be arcuate; they can be also hook-shaped; the movement paths can also be lineally outwardly direct, to obtain the greatest distance from each other, whereas for the entering of the mould-part concerned into the interior of the mould, they can run lineally correspondingly in the opposite direction. The expression "non-lineal movement" is to be understood to mean that the movement of the spreading elements in relation to the mould-part entering into the interior of the mould is not lineal.

A further important characteristic of the device of the invention is that with the use of spreader mandrels the material surrounding each mandrel is blown up to form a cylindrical hollow body. This arrangement of the invention prevents the material surrounding the spreader mandrel from sticking to the said mandrel after the closing of the mould; furthermore the necesary chilling of the material surrounding the spreader mandrel is achieved and the stripping of the material is facilitated. In order to facilitate still further the stripping of the material the spreader mandrel is preferably strengthened somewhat at the sealing place.

The device for carrying out the invention has the feature that with the use of the spreader mandrels engaging in the tube, the said mandrels are actuable independently of the movement of the parts of the blast mould along movement paths that are the same or different, straight and/or non-lineal. By this arrangement and construction of the invention of the spreader mandrels it is obtained with reference to their actuation that the lineal and non-lineal movements necessary at any time can be carried out independently of each other and of the movements of the parts of the blast mould. Preferably each spreader mandrel will be constructed as blast mandrel; the parts of the blast mould are provided in the invention with recesses which when the mould is closed form complete reception chambers for the spreader mandrels; the diameter of the said reception chambers is in the invention greater than the outer diameter of the mandrels plus the doubled wall-thickness of the tube. When the mould is closed, as well as the body to be blasted also the material received in the reception chambers for the spreader mandrels is blown to form a hollow body. In place of the supply of blast air through the spreader mandrel, the blast air can also be supplied laterally through a hollow needle which pierces the tube formed in the receiving chamber above the spreader mandrel and blows it up.

A further characteristic of the device of the invention consists in that with the use of spreading elements engaging from the outside, the said elements are constructed as grippers gripping the tube over its entire length, said grippers independently of the movement of the parts of the blast mould being actuable along movement-paths that are the same or different, lineal and/or non-lineal. The said spreading elements engaging from the outside and constructed as grippers also make possible the carrying out of any desired lineal or non-lineal movements which are independent of the movements of the parts of the blast mould. The grippers of the invention can be constructed as pincers which grip the tube and bring it to the shape given by its movement; the gripper can also consist of suction strips which rest on the surface of the tube by underpressure and also give the tube the desired pre-shape; the grippers can further also consist of a combination of a suction strip and pincers, and in this case first the suction strip comes into effect and holds the tube fast, and then the pincers exert the actual gripping effect. Pincers as gripper will advantageously be used where it is possible by the partly closing mould-parts to introduce the pre-shaping over the closing edges of the individual mould-parts, as here the pincers can easily grip the tube already shaped to a certain extent and pass it over into the final pre-shaped position. If this it not possible, advantageously use is made of a gripper constructed as suction strip or as suction strip and pincers combined.

A variation of the device for carrying out the method has the feature that on the top-side and under-side of each part of the blast mould two pivotable spreader arms are fixed, which in a known way are directed oppositely to each other and are arranged in such a way that each arm of two adjacent parts of the blast mould during the closing movement of the mould form pincers gripping the tube. The invention provides an arrangement on each spreader arm of a spring acting against the direction of the spreading. The said spreader arms are connected with the parts of the blast mould, so that the spreading of the tube must take place here as a function of the closing movement of the parts of the blast mould.

The invention will now be described with reference to the accompanying drawings which show embodiments of the invention by way of example and in no restrictive sense.

FIGURE 1 is a diagrammatic representation of a mould-half with spreader mandrels and blast nozzles.

FIGURE 2 is a cross section through a three-part blast mould as in FIGURE 1.

FIGURE 8 is a representation of the mould of FIGURE 5 with spreader arms pivotably fixed on the mould-part.

FIGURE 9 is a representation of FIGURE 8, with closed mould.

Figure 3:
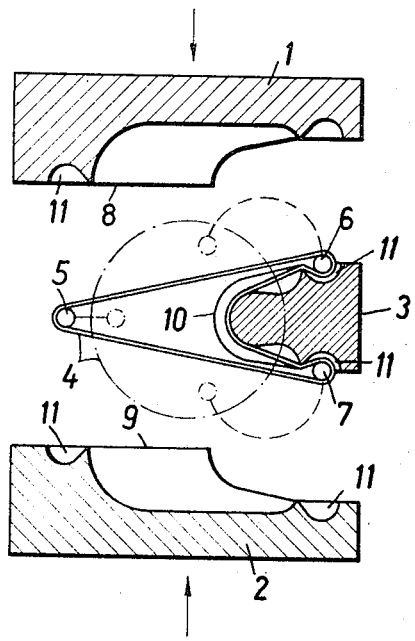
FIGURE 3 is a representation of FIGURE 2, with pre-shaped tube.
Figure 4:
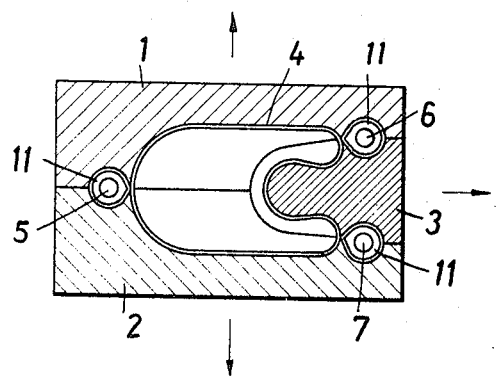
FIGURE 4 is a representation of FIGURE 3 with closed mould.

FIGURES 1 and 2 show a three-part blasting mould consisting of the mould parts 1, 2 and 3. In the tube 4 inserted into the open mould 1, 2, 3, three spreader mandrels 5, 6 and 7 are inserted from below. The spreader mandrels 6 and 7 are moved along the movement paths shown in broken lines, until they have the greatest mutual distance. When this position is reached, the mould-part 3 comes into engagement with the surface of the tube spread in this way and moves in the direction of the arrow as indicated into the interior of the mould, and at the same time the spreader mandrels 6 and 7 continue their path until they have reached the end-position shown in FIGURES 2 and 3. During the insertion of the mould-part 3 into the mould, the spreader mandrel 5 is moved into the end-position shown in FIGURES 2 and 3. In this state the end-position shown in FIGURE 3 is reached. Instead of the circular movement paths, the spreader mandrels 6 and 7 can also describe a hook-shaped path or a lineal path in two opposite directions. In this connection naturally the mould part 3 must travel a correspondingly longer path in order to reach the end-position shown in FIGURE 3. When the position shown in FIGURE 3 has been reached, also the mould parts 1 and 2 are moved in the direction of the arrow as indicated in FIGURE 3 so that the closed position shown in FIGURE 4 results. In this position the closure edges 8, 9 and 10 of the mould parts 1, 2 and 3 meet each other and form the bases of the hollow body. As can be seen from FIGURE 4, the closure edge 8 passes over the actual joining line of the spreader mandrels 5 and 6 into the interior of the mould, and correspondingly the closure edge 9 of the mould-part 2 and the closure edge 10 of the mould-part 3. The part-space formed between the part 1 and part 3 and between the part 3 and the part 2 do not need to extend over the entire height of the mould, but can for example be restricted by the upper and lower part of the mould, whereas in the mid-region the said part-spaces are separated off by squeezing and are united with the hollow space surrounding the spreader mandrels 6 and 7; in this way one can for example produce by the blast process the body and legs of a four-legged animal. Naturally one can also produce for example container handles on a part of the canister itself. The mould-parts 1, 2 and 3 have recesses 11, which when the mould is closed as in FIGURE 4, join up to make the closed chambers 11, in which the spreader mandrels 5, 6 and 7 are received. The diameter of the said chambers 11 is such that the material surrounding the mandrels 5, 6, and 7 can be blown up to form a hollow body, in order to facilitate stripping and to accelerate the necessary cooling of the material. In this connection, either the spreader mandrels 5, 6, 7 themselves can be constructed as blast mandrels, or there can be an arrangement, which is not shown in the drawing, of a hollow needle on one of the mould-parts 1, 2, 3, which by piercing the tube formed in the chamber 11 makes it possible to blow it up to form a hollow body.

Figure 5:
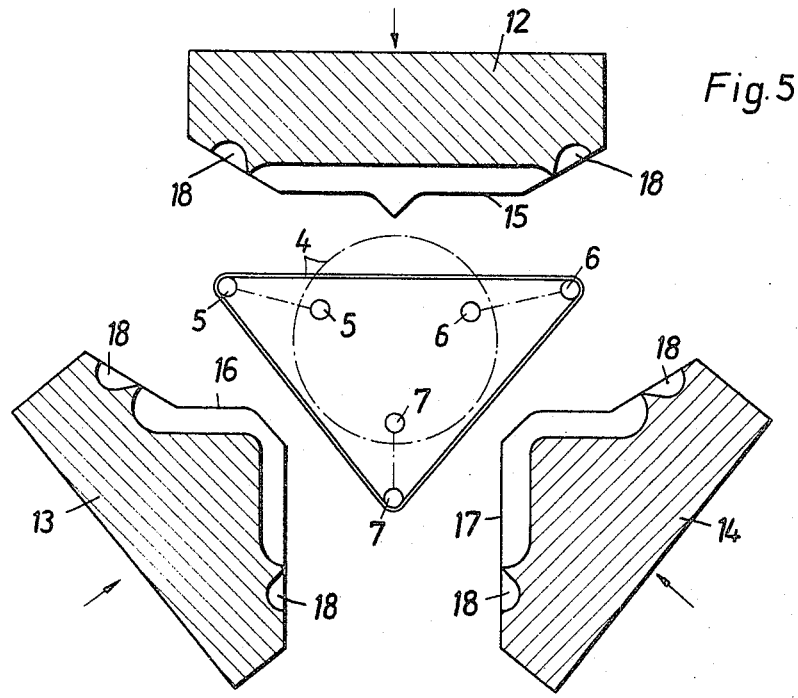
FIGURE 5 is a representation of a variation of a three-part mold.
Figure 6:
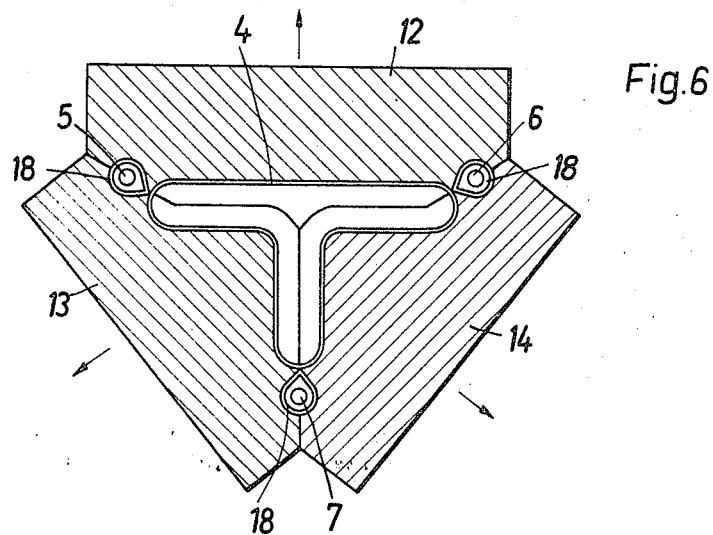
FIGURE 6 is a representation of FIGURE 5 with closed mould.
Figure 7:
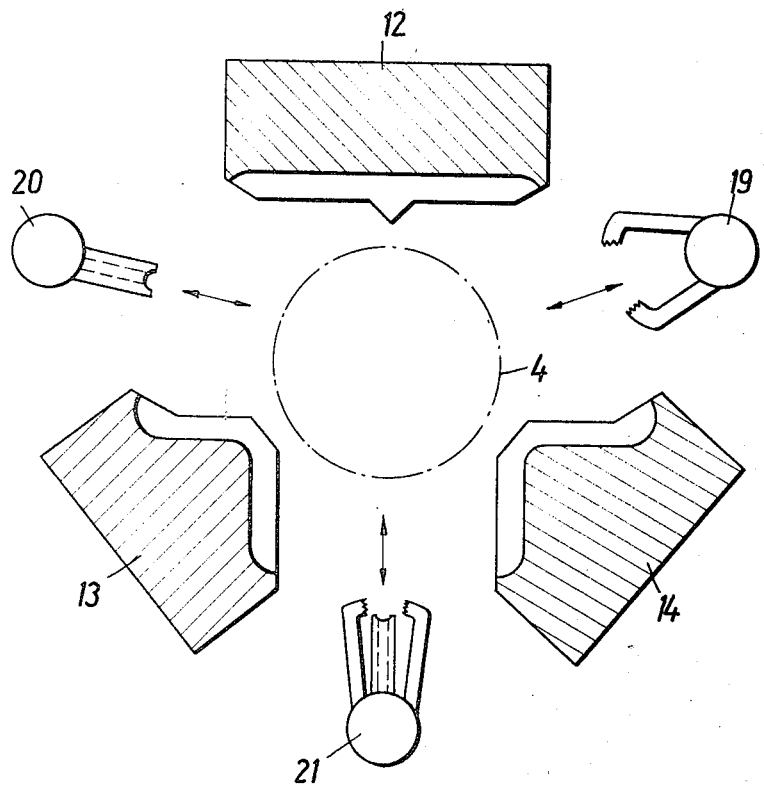
FIGURE 7 is a representation of a three-part mould of FIGURE 5 with spreader elements constructed as pincers or as suction strip.

FIGURES 5 and 6 show a variation of a three-part mould consisting of the mould-parts 12, 13 and 14, which are used for the production of a T-shaped hollow body. The tube 4 is inserted into the opened mould as in FIGURE 5, and is conveyed over by means of the spreader mandrels 5, 6, and 7, into the triangular shape. While this takes place the spreader mandrels 5, 6 and 7 travel over lineal paths of differing lengths and differing directions, as made necessary by the part concerned in order to obtain an even wall thickness. As FIGURE 6 shows, here also the closure edges 15, 16 and 17 of the mould parts 12, 13 and 14 pass over the lineal joining lines of the spreader mandrels 5, 6 and 7 into the interior of the mould and form in common the bases of the T-shaped hollow body. Here also appropriate groove-shaped recesses 18 are provided in the mould-parts 12, 13 and 14, which form the receiving chambers for the spreader mandrels 5, 6 and 7 which again make it possible to blow up the material surrounding these mandrels to form a hollow body. FIGURE 7 corresponds to FIGURE 5, with the difference that in place of the spreader mandrels 5, 6 and 7 of FIGURE 5, in FIGURE 7 spreader elements 19, 20 and 21 engaging onto the tube from the outside are provided. The spreader elements 19 have the shape of pincers, the two jaws of which are brought up onto the tube 4 and clamp the latter between them, whereon by pertinent outward movement of the pincers enclosing the surface of the tube, the desired preshape of the tube is obtained. In place of the pincers 19 also the suction strips 20 can be used, and these likewise are brought up onto the tube 4 and grip firmly by underpressure the surface of the tube, so that they produce, on pertinent movement outwards, the desired pre-shape of the tube. The same is true for the use of spreader elements 21, which consist of a combination of suctions strips and pincers.

The embodiment of FIGURES 8 and 9 also shows the three-part mould of FIGURE 5, formed of the mould-parts 12, 13 and 14. On each mould-part are fixed two spreader arms 22 and 23, which are pivotable about a point 24. On each spreader arm 22, 23 engages a path-restricted spring element 25, which brings back the arms 22 and 23 into the position shown in FIGURE 8. When the mould-parts 12, 13 and 14 are brought together, always two arms 22 and 23 of two of the mould-parts come into engagement with the surface of the tube 4, clamp the latter between them and carry out the forming of the tube 4 into a triangular shape, as can be seen in FIGURE 9. The spreader arms 22 and 23 are disposed on the top and bottom of the mould parts 12, 13 and 14, and can draw out the tube clamped between them over the perpendicular closure edges of the mould parts 12, 13 and 14.

I claim:

1. A device for blow moulding hollow bodies comprising blow mould parts forming a mould cavity and recesses adjacent thereof, spreader means insertable in the mould parts to spread a plastic tube into the recesses, said mould parts having means to remove parts of the tube which are forced into the recesses when the mould parts are closed, and means to blow the tube into the mould cavity.

2. A device for blow moulding hollow bodies according to claim 1, in which the mould parts are three in number.

3. A device for blow moulding hollow bodies according to claim 1, in which the plastic tube is round before it is inserted in the mould parts and the spreader means contact the tube over its entire length.

4. A device for blow moulding hollow bodies according to claim 1, in which there are three moulded parts and the spreader means are in the form of mandrels of which there are three in number.

References Cited

UNITED STATES PATENTS

| | | |
|---|---|---|
| 3,004,285 | 10/1961 | Hagen. |
| 3,162,707 | 12/1964 | Scott et al. |
| 3,278,665 | 10/1966 | Harrison. |
| 2,364,029 | 11/1944 | Ryan _____ 18—35 X |
| 2,582,165 | 1/1952 | Rosenfeld. |
| 2,944,335 | 7/1960 | Kabel _____ 29—235 |
| 3,135,998 | 6/1964 | Fowler et al. |
| 3,172,927 | 3/1965 | Mojonnier. |

WILBUR L. McBAY, *Primary Examiner.*

U.S. Cl. X.R.

18—19; 29—235; 264—94